July 16, 1963
A. J. KINDIG
3,097,541
SEGMENTED WHEEL STRUCTURE
Filed Aug. 31, 1961
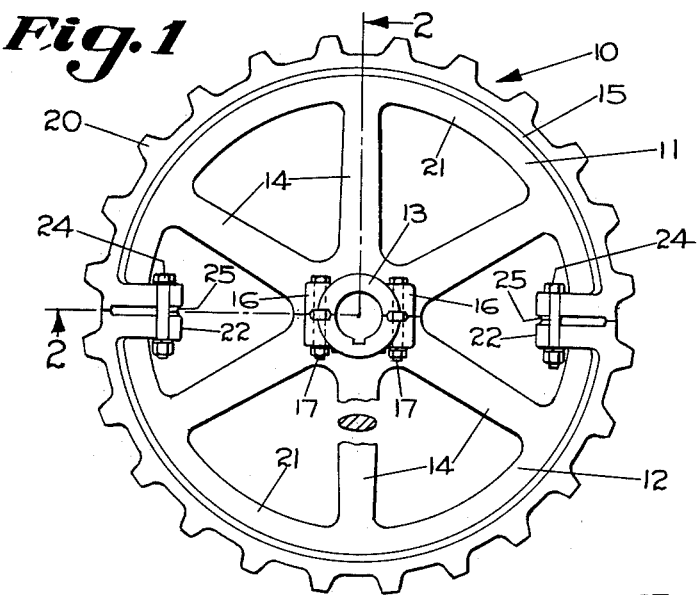
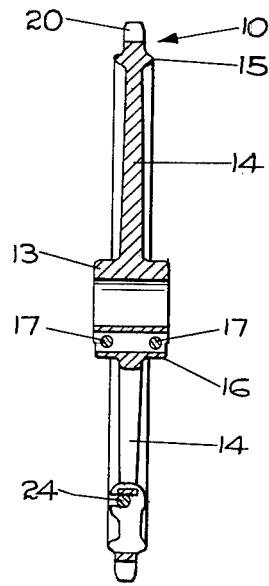
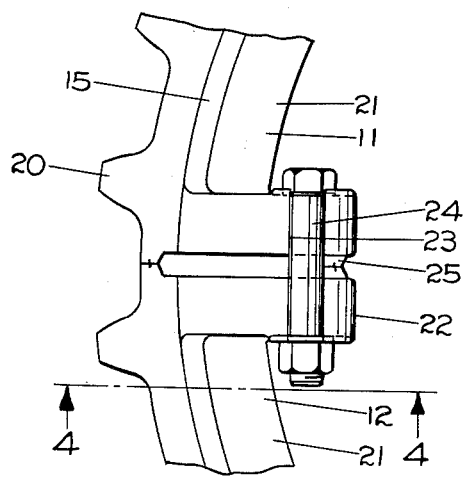
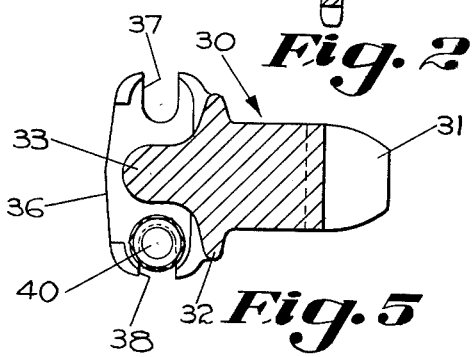
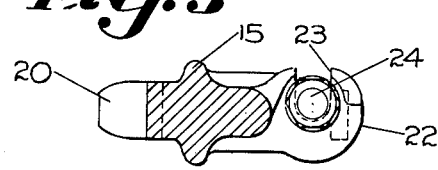
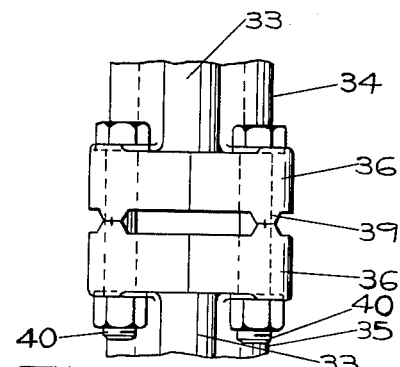
INVENTOR;
ARNIE J. KINDIG,
BY David Young
ATT'Y.

United States Patent Office 3,097,541
Patented July 16, 1963

3,097,541
SEGMENTED WHEEL STRUCTURE
Arnie J. Kindig, Columbus, Ohio, assignor, by mesne assignments, to Jeffrey Galion Manufacturing Company, a corporation of Ohio
Filed Aug. 31, 1961, Ser. No. 135,327
1 Claim. (Cl. 74—243)

The instant invention relates to wheel structures made up of a plurality of wheel segments which are joined together to form the wheel structure.

It is the prime object of the instant invention to provide an improved wheel structure in which the wheel segments thereof may be easily secured together to form the wheel structure.

It is another object of the instant invention to provide an improved wheel structure comprising a plurality of wheel segments joined together, in which the fastening means for securing the wheel segments together is disposed closely adjacent to the rim of the wheel for most effective application of the force holding the wheel segments together.

It is a further object of the instant invention to provide an improved wheel structure comprising a plurality of wheel segments held together by fastening means, in which the fastening means may be easily attached to or removed from the wheel structure, for assembly and disassembly, respectively.

It is still another object of the instant invention to provide an improved wheel structure comprising a plurality of wheel segments, in which the wheel structure may be easily assembled or disassembled on a shaft, without removal of the shaft from its supporting structure.

It is still a further object of the instant invention to provide an improved cast wheel structure comprising a plurality of cast wheel segments and including integral means for securing the wheel segments to each other, which may be cast integrally with the wheel segments.

Other objects of the invention will appear hereinafter, the novel features and combinations being set forth in the appended claim.

In the accompanying drawings:

FIG. 1 is an elevational view of a sprocket wheel constructed in accordance with the instant invention;

FIG. 2 is a sectional view of the sprocket wheel, taken on the line 2—2 in FIG. 1;

FIG. 3 is an enlarged view of the joint between the wheel segments;

FIG. 4 is a sectional view of the rim portion of the sprocket wheel, taken on the line 4—4 in FIG. 3;

FIG. 5 is a sectional view of the rim portion of a sprocket wheel, showing a modified form of the invention; and FIG. 6 is a view of the modified form of the invention, showing the joint between wheel segments.

In the manufacture of sprocket wheels and other wheel structures, it is frequently the practice to form such wheels of two or more segments which are joined together to constitute the wheel. This practice makes it possible to assemble and disassemble the wheel on a shaft while the latter is maintained in its supporting structure. Thus the wheel segments may be placed on the shaft, or removed from the shaft, in a lateral direction, rather than sliding the wheel onto the shaft in an axial direction, it being understood that in order to follow the latter procedure it is usually necessary to remove the shaft from its supporting bearings.

Referring to FIGS. 1 to 4 of the drawings, there is illustrated therein a sprocket wheel 10 which is formed of two wheel segments 11, 12, each of the latter extending through an arc of 180°, and being adapted to be joined together to form the sprocket wheel 10. The wheel segments 11, 12 may be formed by casting, and are identical. Accordingly, it will suffice to describe only the wheel segment 11.

The wheel segment 11 has a hub 13, by which the sprocket wheel 10 is supported on a shaft. A plurality of spokes 14 extend radially outwardly from the hub 13 and support a peripheral rim 15, which extends laterally to opposite sides of the spokes 14. Bosses 16 are formed at opposite sides of the hub 13, and at opposite sides of the spokes 14, adjacent to the hub 13. The bosses 16 on the opposite wheel segments 11, 12 are adapted to receive bolts 17 by which the hub 13 is securely fastened to the shaft on which the sprocket wheel 10 is supported. The bolts 17 being disposed rather close to the axis of the sprocket wheel 10, there is ample clearance for removing the same from the bosses 16, as well as inserting them into the bosses 16, when the sprocket wheel 10 is assembled or disassembled on the shaft.

Sprocket teeth 20 extend radially outwardly from the rim 15, and are cast as an integral element of the sprocket wheel segment 11. On the opposite side of the rim 15 the latter includes a rib 21, which extends radially inwardly from the rim 15 and serves to strengthen the peripheral portion of the sprocket wheel 10.

At each end of the wheel segment 11 there is formed a lug 22 which extends radially inwardly from the rim 15. As best seen in FIG. 4, the lug 22 is no wider than the rim 15, and in the illustrated embodiment the lug 22 is of slightly less width than the rim 15. The lugs 22 are disposed closely adjacent to the rim 15, and when the wheel segments 11, 12 are joined together, the lugs 22 on the respective wheel segments are aligned with each other. Each lug 22 is formed with a notch 23, which opens in an axial direction of the wheel 10. A bolt 24 is received in the notches 23 of adjacent lugs 22, for securing the peripheral portions of the wheel segments 11, 12 to each other. The sprocket teeth 20 are so formed on the wheel segments 11, 12 that they are continuous when the wheel segments 11, 12 are joined to each other. Each of the lugs 22 is formed with an abutment 25, which bear on each other when the bolt 24 is tightened.

In assembly or disassembly of the sprocket wheel 10, the bolt 24 is placed in the notches 23 of adjacent lugs 22, in an axial direction of the wheel 10. Thus the bolt 24 need not be disassembled by removal of the nut from the threaded part. There is no problem of interference of the bolt 24 with any of the elements of the wheel 10, such as the peripheral rim 15 and the rib 21. Thus the lugs 22 may be designed, and the bolts 24 selected for the desired holding force to maintain the wheel segments 11, 12 in assembly, without the provision of any substantial clearances from the adjacent portions of the wheel 10.

In applying the instant invention to larger wheel structures, it may be desired to make provision for two bolts at each joint between wheel segments, rather than the one bolt as illustrated in FIGS. 1 to 4. Referring to FIGS. 5 and 6, there is illustrated a larger sprocket wheel structure 30 formed with peripheral sprocket teeth 31, extending radially outwardly from a peripheral rim 32. The rim 32 includes a reinforcing rib 33 which extends radially inwardly from the rim 32. At the joint between adjacent wheel segments 34, 35 each of the latter is formed with a lug 36 which extends to opposite sides of the rib 33. Each lug 36 is formed with notches 37, 38, disposed on opposite sides of the rib 33 and opening in opposite axial directions of the wheel 30.

When the wheel segments 34, 35 are joined together, the lugs 36 on the respective wheel segments 34, 35 are disposed adjacent to each other, with the abutments 39 of the lugs 36 bearing against each other. The notches 37, 38 in the lugs 36 are aligned with each other, to receive bolts 40 which may be inserted into the notches 37, 38 in an axial direction of the wheel 30. The bolts 40 are tightened against the lugs 36, to secure the peripheral portions of the wheel segments 34, 35 together, to form the complete wheel structure 30. In this embodiment of the invention it is also possible to design the lugs 36 and to select the size of the bolts 40, in accordance with the holding requirements of the wheel structure 30, and without the provision of any substantial clearances for the insertion and removal of the bolts 40, since the latter are inserted into and removed from the notches 37, 38 in an axial direction of the wheel 30.

It will be apparent that the wheel segments described herein, including the lugs by which the wheel segments are joined to each other and the notches formed in the lugs, may be cast as integral elements. The assembly and disassembly of a wheel constructed in accordance with this invention, is greatly facilitated and may be accomplished on a shaft that is retained in its supporting structure. The bolts or other fastening means by which the peripheral portions of the wheel segments are secured to each other, are inserted into the notches of the lugs in an axial direction, whereby it is not required that any exceptional allowances be made to provide clearance for the securing bolts. Also, the bolts or other fastening means that may be used, are disposed along a generally chordal line with respect to the wheel structure, for optimum application of force to hold the wheel segments together in assembly.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

A cast wheel structure comprising at least two cast wheel segments joined together in assembly, each wheel segment having a rim portion to form the peripheral rim of the wheel when the segments are joined together, each wheel segment including a rib portion integrally cast with the rim portion to form a reinforcing rib of the wheel when the segments are joined, said rib extending radially inwardly of the rim and being smaller in an axial direction than the rim, a pair of integral cast lugs on each wheel segment disposed radially inwardly from the rim, said lugs being disposed on opposite sides of said rib and closely adjacent to said rib and said rim, said lugs being of substantial thickness in both axial and circumferential directions, the lugs on the respective wheel segments being adjacent each other and in alignment when the wheel segments are joined, a cast notch in each lug, said notches being disposed substantially in alignment wtih said rib in an axial direction, the notches in said lugs which are disposed on opposite sides of said rib as aforesaid being open in opposite axial directions, the notches in adjacent lugs of joined wheel segments being disposed in alignment with each other along chordal lines closely adjacent to the peripheral rim and within the peripheral rim, and fastening means disposed along said chordal lines and received in the notches of adjacent lugs for securing the wheel segments together in joined relationship, the force of said fastening means acting along said chordal lines and close to the peripheral rim of the wheel to firmly secure the wheel segments together.

References Cited in the file of this patent
UNITED STATES PATENTS

| | | |
|---|---|---|
| 826,757 | Waterfield | July 24, 1906 |
| 1,649,978 | Rouanet | Nov. 22, 1927 |
| 2,465,570 | Bocchino | Mar. 29, 1949 |

FOREIGN PATENTS

| | | |
|---|---|---|
| 25,708/35 | Australia | Nov. 25, 1936 |